United States Patent
Vittitoe

(10) Patent No.: US 7,616,349 B2
(45) Date of Patent: Nov. 10, 2009

(54) FONT SHARPENING FOR IMAGE OUTPUT DEVICE

(75) Inventor: Neal F. Vittitoe, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 609 days.

(21) Appl. No.: 10/788,566

(22) Filed: Feb. 27, 2004

(65) Prior Publication Data

US 2005/0190408 A1  Sep. 1, 2005

(51) Int. Cl.
*G06T 5/00* (2006.01)

(52) U.S. Cl. .................. 358/3.27; 358/1.11; 358/3.06; 382/263; 382/264; 382/269; 382/266; 715/700; 399/81

(58) Field of Classification Search ............. 358/3.06, 358/3.27, 1.11, 3.2, 3.21; 382/176, 254, 382/263, 266, 269, 264; 715/700; 399/81
See application file for complete search history.

(56) References Cited

U.S. PATENT DOCUMENTS

| | | | |
|---|---|---|---|
| 5,579,446 A | 11/1996 | Naik et al. | |
| 5,668,635 A | 9/1997 | Tomida et al. | |
| 5,704,021 A | 12/1997 | Smith et al. | |
| 5,751,433 A | 5/1998 | Narendranath et al. | |
| 5,751,434 A | 5/1998 | Narendranath et al. | |
| 5,862,257 A | 1/1999 | Sekine et al. | |
| 5,949,964 A | 9/1999 | Clouthier et al. | |
| 6,249,353 B1 | 6/2001 | Yoshida et al. | |
| 6,252,677 B1 * | 6/2001 | Hawes et al. | 358/1.9 |
| 6,373,594 B1 | 4/2002 | Yao et al. | |
| 6,453,132 B2 * | 9/2002 | Ishikura | 399/81 |
| 6,628,426 B2 | 9/2003 | Denton et al. | |
| 6,970,598 B1 * | 11/2005 | Nagarajan et al. | 382/173 |
| 7,079,287 B1 * | 7/2006 | Ng et al. | 358/2.1 |
| 7,085,000 B2 * | 8/2006 | Coleman | 358/1.15 |
| 2001/0030769 A1 | 10/2001 | Jacobs | |
| 2002/0186416 A1 | 12/2002 | Trelewicz et al. | |
| 2003/0058474 A1 * | 3/2003 | Loce et al. | 358/2.1 |

OTHER PUBLICATIONS

Joyce E. Farrell, "Print Quality Metrics for Grayscale Text", 1990, In Proceedings of the SPSE Fifth International Congress on Non-Impact Printing Technologies.*
2003/0058474; Font Characteristic Driven Halftoning; Mar. 27, 2003; Xerox Corporation; Loce, et al.
2002/186416; Method, Apparatus and Article of Manufacture for Modifying Printing Based Upon Direct On-The-Fly Media Characteristic Parameters; Dec. 12, 2002; IBM; Trelewicz et al.
2001/0030769; Apparatus and Method for Halftone Hybrid Screen Generation; Oct. 18, 2001; Xerox Corporation; Jacobs.

* cited by examiner

*Primary Examiner*—King Y Poon
*Assistant Examiner*—Jamares Washington

(57) ABSTRACT

A method of rendering text in an image forming device comprises providing a user interface to receive a user-defined font sharpening threshold; receiving the user-defined font sharpening threshold entered by user via the user interface, selecting a halftone screen for text based on text size and a user defined font sharpening threshold; and rendering the text with the selected halftone screen.

5 Claims, 7 Drawing Sheets

FONT SHARPENING FOR IMAGE OUTPUT DEVICE

FIELD OF THE INVENTION

The present invention relates to a system and method of selecting halftone frequencies for halftone screens for text. More particularly, the invention relates to a method of selecting the halftone frequency of the halftone screen for text based on font size.

BACKGROUND OF THE INVENTION

Typical imaging devices, such as printers and copiers, use a page description language (e.g., Postscript) to print documents. Prior to printing, a language interpreter classifies the objects in a document or page into a finite set of categories such as text, graphics, or image. Because each of these categories of objects has different visual characteristics, it is often desirable to render the objects using different types of halftone screens. For example, text objects may be rendered using a higher frequency halftone screen than that used for printing graphics or image objects to improve the edge definition of the text characters. However, higher frequency halftone screens magnify undesirable printer artifacts, such as "banding" and "noise," which become visually more noticeable as the text characters being printed get larger (i.e., the font size increases).

To prevent unwanted print artifacts in large text, many printers change the halftone frequency of the halftone screen for text when the font size exceeds a predetermined threshold. This threshold value is predetermined, and is set in the RIP code at the time of manufacture. For text characters printed at or below the threshold, high frequency halftone screens are used to print the characters, while the normal frequency halftone screen is used to print characters that are above the threshold. However, the predetermined threshold value is fixed for all users, and can only be changed via a special file that must be acquired from the manufacturer and downloaded to the imaging apparatus. This special file is typically not readily available to the public. Thus, there is no user-friendly way for a given user to modify or adjust the threshold value to tailor the threshold value to a given circumstance.

SUMMARY OF THE INVENTION

The present invention relates to an image forming device with an object-oriented raster image processor that selects different halftone screens for different objects in the same output image based at least in part on the types of objects in the output image. The raster image processor renders text using a halftone screen having a halftone frequency selected based on text size and a user-defined font sharpening threshold. In one exemplary embodiment, the raster image processor renders text characters having a size equal to or less than the font sharpening threshold with a relatively higher frequency halftone screen, and renders text characters with a size greater than the font sharpening threshold with a relatively lower frequency halftone screen.

In one exemplary embodiment, a menu item accessible via the Operation Panel allows the user to change the threshold for font sharpening. In particular, a user may select FONT SHARPENING in an available menu to adjust the value of the font sharpening threshold. When the user selects FONT SHARPENING from the menu, the user is prompted to enter a value ranging from 0 to 150. This number is an integer, and corresponds to the upper point size limit (i.e., the font size) at which the high frequency halftone screens will be used to print text characters. Whatever value the user enters will become the new font sharpening threshold. The default value is 24. A user-defined value of "0" indicates that the high frequency halftone screens will not be used to print any of the text characters.

DETAILED DESCRIPTION OF THE INVENTION

Figure 1:
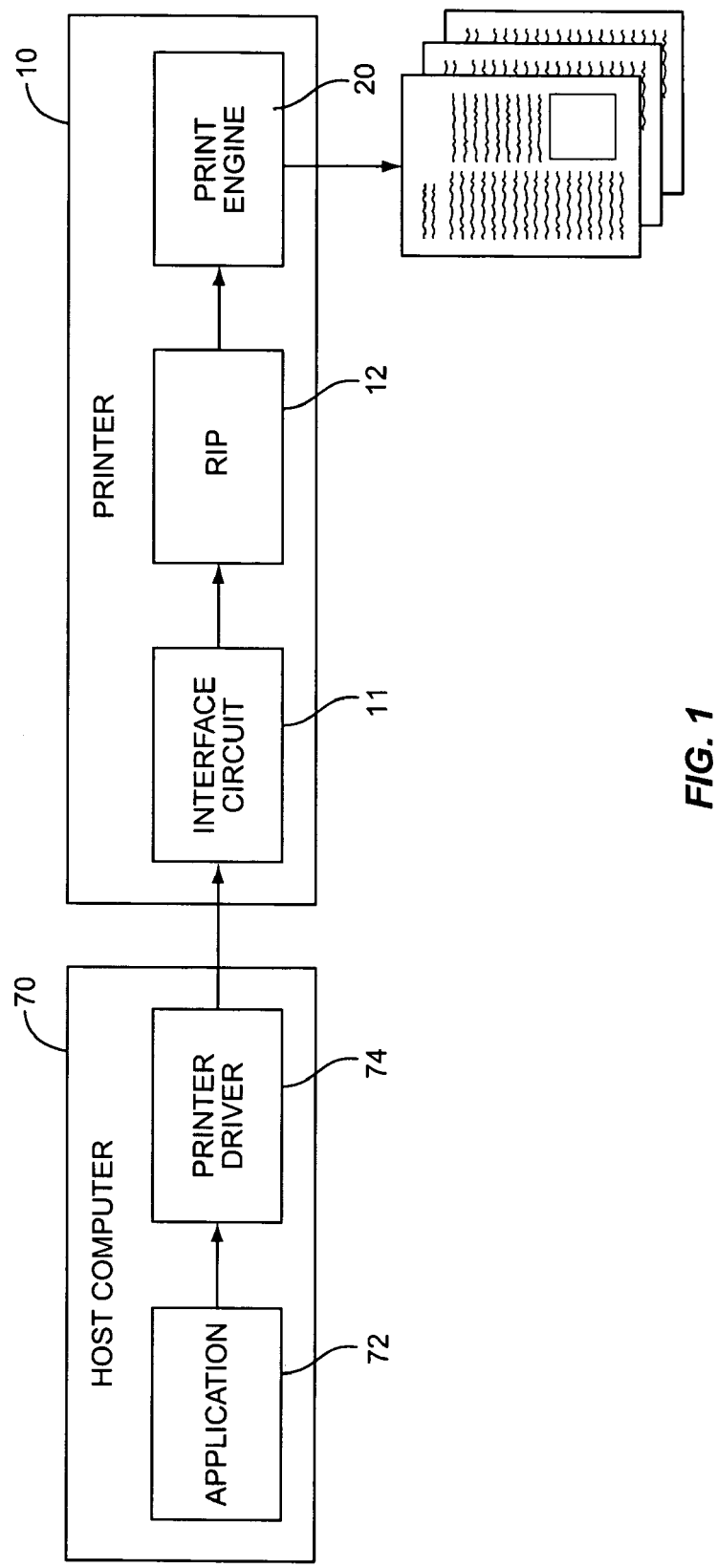
FIG. 1 is a functional block diagram of an exemplary printing system.

FIG. 1 illustrates a printing system for printing pages using a high-level page description language (PDL) such as ADOBE POSTCRIPT or HEWLETT-PACKARD PCL (Printer Control Language). A PDL is a programming language for describing the layout and contents of a page. A PDL allows an application in a host computer to describe the appearance of a page containing a variety of objects including text, graphics, and images in terms of geometrical objects rather than device pixels. The page description is device independent and can be used to produce high quality output with a broad range of printers, displays and other image output devices.

FIG. 1 depicts an image output device 10, which could be any type of raster output device. The exemplary image output device 10 shown in FIG. 1 is a color laser printer, but the present invention could also be used in a monochrome printer. The printer 10 is connected to a host computer 70, which may be any general purpose programmable computer. An application 72 in the host computer generates pages to be printed by the printer 10. The application 72 may itself generate pages in a PDL language suitable for printing, or may use a printer driver 74 to convert pages generated by the application 72 from the application's native format into a suitable PDL file understood by the printer 10. The PDL file describes the layout and contents of the page to be printed.

The printer 10 includes an interface circuit 11, a raster image processor (RIP) 12 and a print engine 20. The interface circuit 11 connects the printer 10 to a remote computer, such as host computer 70. The interface circuit could for example comprise a parallel or serial interface, a USB interface, or an Ethernet interface. The RIP 12 converts the code of the PDL file to raster image data and outputs the raster image data to the print engine 14, which prints the page on a print media. The process of converting a PDL file into raster image data is known as rasterization. The raster image data output from the RIP 12 is a bit-mapped image suitable for printing by the print engine 20.

Figure 2:
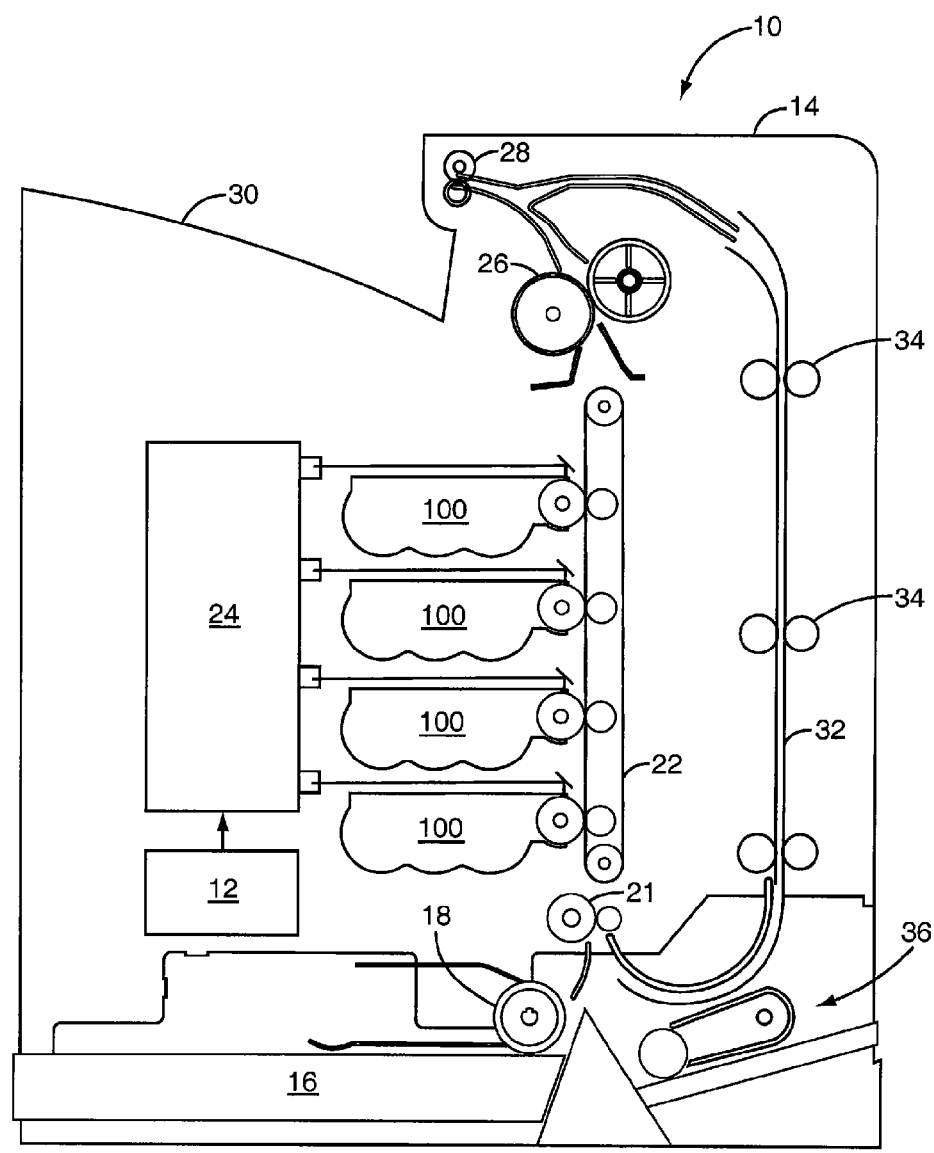
FIG. 2 is a schematic illustration of an exemplary electrophotographic printer.

FIG. 2 depicts printer 10 in more detail. The printer 10 comprises a main body 14, at least one media tray 16, a pick mechanism 18, a registration roller 20, a media transport belt 22, a printhead 24, a plurality of image forming stations 100, a fuser roller 26, exit rollers 28, an output tray 30, a duplex path 32, and a user panel 40 The media tray 16, disposed in a lower portion of the main body 14, contains a stack of print media on which images are to be formed. The media tray 16 is preferably removable for refilling. Pick mechanism 18 picks up media sheets from the top of the media stack in the media tray 16 and feeds the print media into a primary media path. Registration roller 21, disposed along a media path, aligns the print media and synchronizes the advancement of the print media with the timing of the image forming units. Media transport belt 22 transports the print media along the media path past each of the image forming stations 100, which apply toner images to the print media. Color printers typically include four image forming stations 100 for printing with cyan, magenta, yellow, and black toner to produce a four-color image on the media sheet. Each image forming station 100 includes a photoconductive member on which a latent image is formed and developed to produce the toner image. Printhead 24 forms the latent image on the photoconductive member using a laser to discharge areas on the surface of the photoconductive member according to bit-mapped image data output by the RIP 12. The RIP 12 may be incorporated into the printhead head 24.

The media transport belt 22 conveys the print media with the color image thereon to the fuser roller 26, which fixes the color image on the print media. Exit rollers 28 either eject the print media to the output tray 30, or direct it into a duplex path 32 for printing on a second side of the print media. In the latter case, the exit rollers 28 partially eject the print media and then reverse direction to invert the print media and direct it into the duplex path 32. A series of rollers 34 in the duplex path 32 return the inverted print media to the primary media path for printing on the second side. The image forming apparatus 10 may further include an auxiliary feed 36 to manually feed media sheets.

Figure 3:
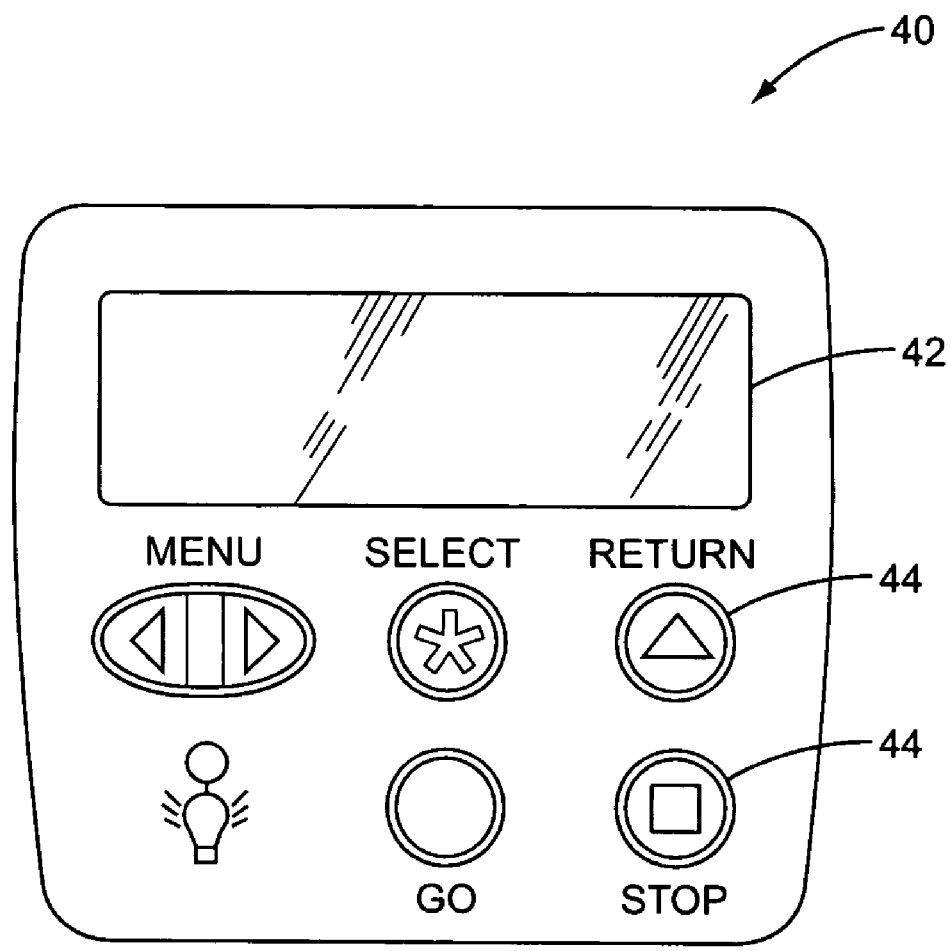
FIG. 3 is a plan view of an operator panel for the exemplary electrophotographic printer shown in FIG. 2.

The user panel 40 receives user input for controlling operation of the printer 10 and outputs information on displays for the user. An exemplary user panel 40 is shown in FIG. 3. The user panel 40 includes an LCD display 42, and a plurality of control buttons 44. The MENU button takes the printer offline and allows the user to scroll through various menus and menu items. The SELECT button is used to select menus and options displayed on the display. The SELECT button may be used for example to open a highlighted menu on a menu list, or to select a default value for a menu item, such as image resolution. The RETURN is used for navigation through the menus and menu items. Pressing the RETURN button allows the user to return to a previous menu or menu item. The GO button exits menus and returns the printer to a ready state if the printer is offline, and resumes printing operations after loading paper or clearing jams. The STOP button opens highlighted menus in a menu list, saves displayed menu items as default values or presenting information to the user and a variety of input devices, to receive user input.

A RIP 12, in addition to rasterizing images, controls the operation of the user panel 40 and print engine 20. An exemplary RIP 12 suitable for use in the present invention is used in LEXMARK C750 and C752 printers. Inputs for system control may be received from the user panel, microswitches and sensors 44 within the printer, from a host computer to which the printer is connected, or from a remote computer via a local area network. The functions of the RIP 12 include control of print media feeding and handling; and control of image formation. The RIP 12 may be implemented in firmware, hardware, or software, or a combination thereof. The functions of the RIP 12 may be performed by one or more processors, which may be either general purpose processors, digital signal processors (DSPs), or other special purpose processors.

Figure 4:
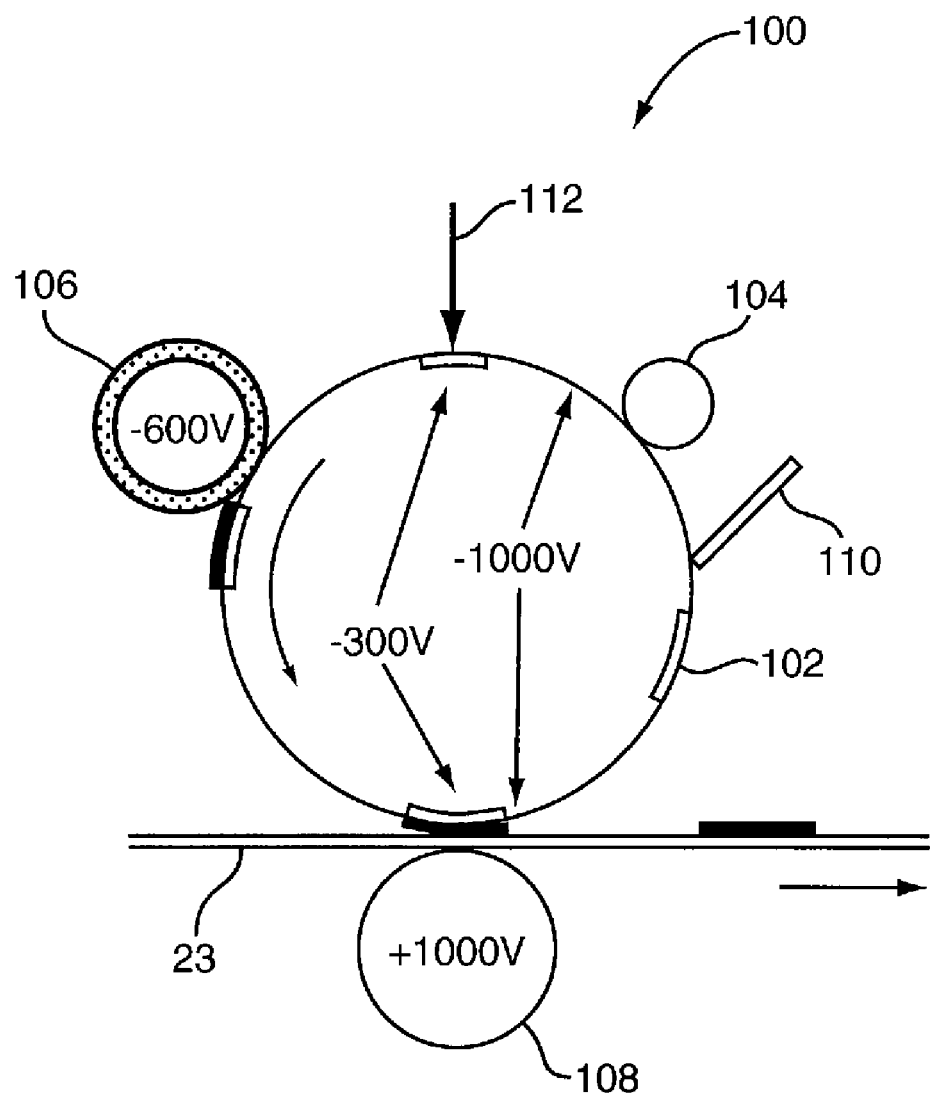
FIG. 4 is a schematic illustration of an image forming station of the exemplary electrophotographic printer shown in FIG. 2.

FIG. 4 is a schematic diagram illustrating an exemplary image forming station 100. Each image forming station 100 includes a photoconductive (PC) drum 102 that receives the latent image, a charging unit 104, a developer roll 106, a transfer device 108, and a cleaning blade 110. The charging unit 104 charges the surface of the PC drum 102 to approximately −1000 v. A laser beam 112 from the printhead 24 discharges areas on the PC drum 102 to form a latent image on the surface of the PC drum 102. The areas of the PC drum 102 illuminated by the laser beam 112 are discharged to approximately −300 v. The PC drum core is held at −200 v. The developer roll 106 transfers negatively-charged toner having a core voltage of approximately −600 v to the surface of the PC drum 102 to develop the latent image on the PC drum 102. The toner is attracted to the most positive surface, i.e., the area discharged by the laser beam 112. As the PC drum 102 rotates, a positive voltage field produced by the transfer device 108 attracts and transfers the toner on the PC drum 102 to the media sheet 23. Alternatively, the toner images could be transferred to an intermediate transfer member (ITM) and subsequently from the ITM to the media sheet 23. Any remaining toner on the PC drum 102 is then removed by the cleaning blade 110. The transfer device may include a roll, a transfer corona, transfer belt, or multiple transfer devices, such as multiple transfer rolls.

Figure 5:
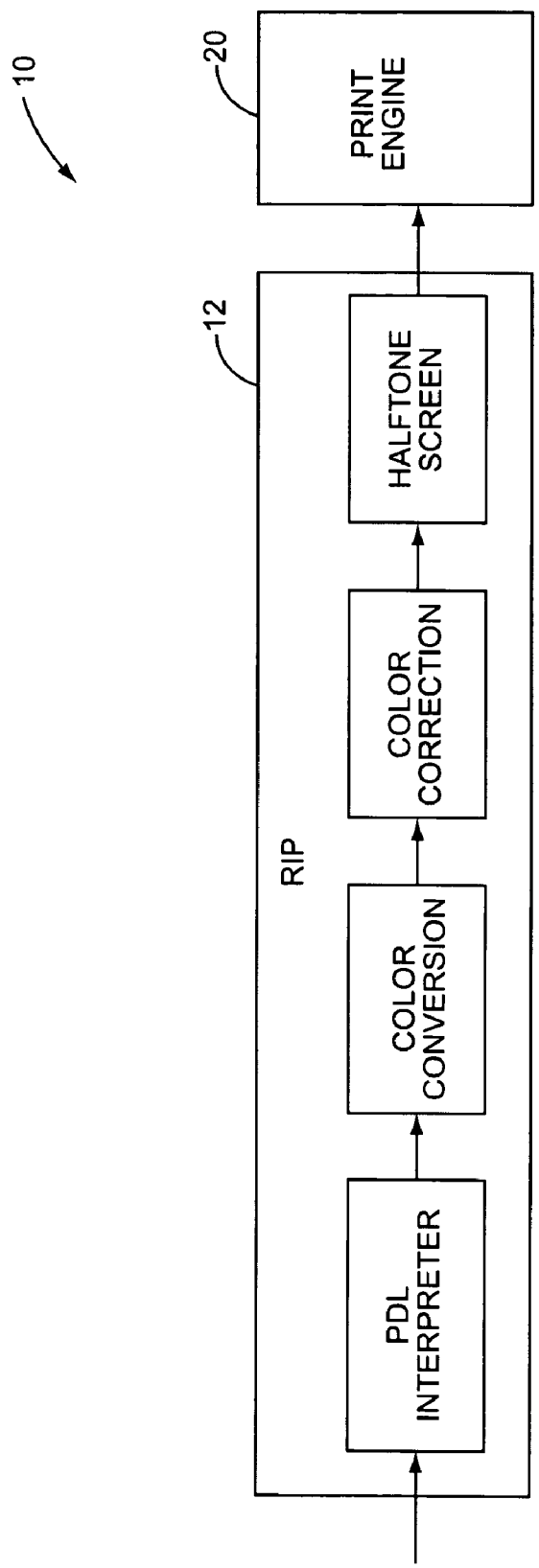
FIG. 5 is a functional block diagram of a raster image processor for the exemplary electrophotographic printer shown in FIG. 2.

FIG. 5 is a block diagram illustrating the rasterization process performed by the RIP 12. The RIP 12 receives a page described in a high-level PDL. A PDL interpreter parses the code in the PDL file and discriminates the objects within the printed page. The RIP 12 classifies the objects based on object type for subsequent processing. For each object present in the page, the RIP 12 performs color conversion, color correction, and halftoning as needed to generate the final bit-mapped image output to the print engine 20. Some objects may not require all three processes. For example, halftoning would not be necessary for halftone images embedded in the page. Page objects may be temporarily stored in memory within the RIP 12 or in external memory while the RIP 12 performs these functions.

Color conversion is performed to convert color specifications from one color space to another. Many applications will specify color in RGB format. Most color printers 10, however, print using cyan, magenta, yellow and black (CMYK) toner. Therefore, colors specified in RGB color space need to be converted to CMYK color space. The RIP 12 uses a color conversion lookup table to map colors specified in RGB color space or other color space to CMYK color space. Different color conversion tables may be used for different objects on a page. CMYK colors are specified as four 8-bit values ranging from 0 to 255. The details of the color conversion process is not material to the invention and are well-known to those skilled in the art. Therefore a more detailed description thereof is omitted The RIP 12 performs color correction following color conversion. Various factors may affect how the colors appear in the final output image including print media characteristics, type of toner, and operating parameters of the print engine. Consequently, colors may not appear as desired or be accurately reproduced in the printed output. Color correction is performed to adjust colors so that the output color will appear as expected. The details of the color conversion process is not material to the invention and are well-known to those skilled in the art. Therefore a more detailed description thereof is omitted After color processing, the RIP 12 converts the objects in the page to a bit-mapped image through a process known as halftoning or dithering. Unlike continuous tone printers, laser printers cannot reproduce continuous tones. Instead, tones are simulated by printing patterns of small dots. The human eye cannot resolve the edge detail of the small dots thus creating an impression of smooth color. Dots are clustered in different proportions to reproduce different colors and gray levels in an image. Any known halftoning methods may be used to implement the present invention. Because halftoning techniques are not a material aspect of the invention and are well-known to those skilled in the art, a detailed description of halftoning is omitted.

To perform halftoning, the image is divided into a plurality of halftone cells, each having a plurality of pixels or dots. A 16×16 halftone cell comprising 256 dots is able to represent 257 levels of gray. A halftone cell comprising 4 dots is able to represent 5 levels of gray There is a tradeoff between the frequency of a halftone screen and gray levels. Higher screen frequencies, because they contain more halftone cells, produce finer screens that can capture more detail from an original image. However, because the resolution of the printer or other output device remains constant, higher screen frequencies mean that each halftone cell will have fewer dots or pixels. Consequently, the number of gray levels that can be reproduced decreases as the halftone screen frequencies increase.

In color printers, an image is separated into four color separations, each with its own halftone screen. Patterns that are created by the combination of two or more screen grids are called "moiré" patterns. There are acceptable and unacceptable moiré patterns. An acceptable moiré pattern is the rosette. Rosettes are pleasing to the eye and, when generated properly, do not detract from the images they recreate. To form a rosette, the four halftone screens (cyan, magenta, yellow, and black) are placed at different angles. In traditional halftone screening, the conventional angles are: black—45°; magenta—75°; cyan—15° or 105°; and yellow—0° or 90°. This angle set is called the conventional angle set. The black separation is placed at 45°—the angle least noticeable to the eye.

Different types of objects in a printed page may require different halftone screens. For example, a halftone screen suitable for printing graphics with large areas of solid color may not be suitable for text or graphics with fine detail. Therefore, different halftone screens may be selected for different objects. The selection of a halftone screen may be based, at least in part, on the object type (e.g., text, graphics, or image). Each object type may be further subdivided into subtypes. For example, a text object may be classified as large text or small text. The halftone screen used to produce the bit-mapped image may be selected based on the object's type and subtype.

When printing text objects, higher frequency halftone screens improve edge definition of halftone text characters. Therefore, it is common practice to select a higher frequency halftone screen for text objects than for graphics or images. However, printer artifacts such as banding and noise can become more noticeable in areas printed using a high frequency screen. These print artifacts are generally not a problem when the text characters are small, but become more noticeable as text characters get larger. Accordingly, in one preferred embodiment of the present invention, a font-sharpening threshold for text is defined. The font-sharpening threshold may be specified, for example, by the size of the text (e.g., 24 point). To improve edge detail of the text characters, a relatively higher frequency halftone screen is used for text in sizes smaller than the font-sharpening threshold, and a relatively lower frequency screen is used for text in sizes greater than the font-sharpening threshold to minimize print artifacts such as banding and noise. In this context, the terms relatively higher and relatively lower do not indicate a particular screen frequency, but simply specify the relationship of the screen frequencies for small and large text. The screen frequency of the halftone screen for small text is relatively higher as compared to the screen frequency for large text, and vice versa. In one exemplary embodiment, the higher frequency halftone screen for text has a frequency greater than about 150 lines per inch and more preferably greater than 200 lines per inch. The lower frequency halftone screen for text has a frequency in the range of 85 to about 150 lines per inch.

Figure 6:
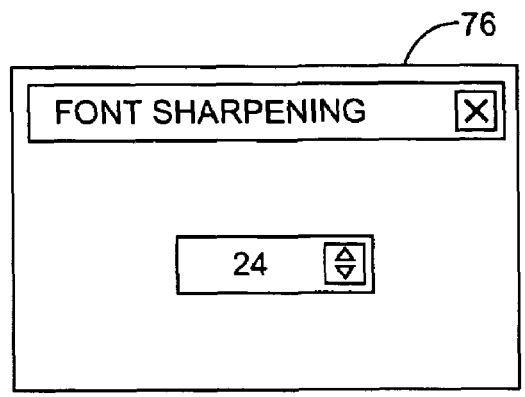
FIG. 6 illustrates an exemplary dialog box displayed by a user application for entering a font sharpening threshold by a user.
Figure 7:
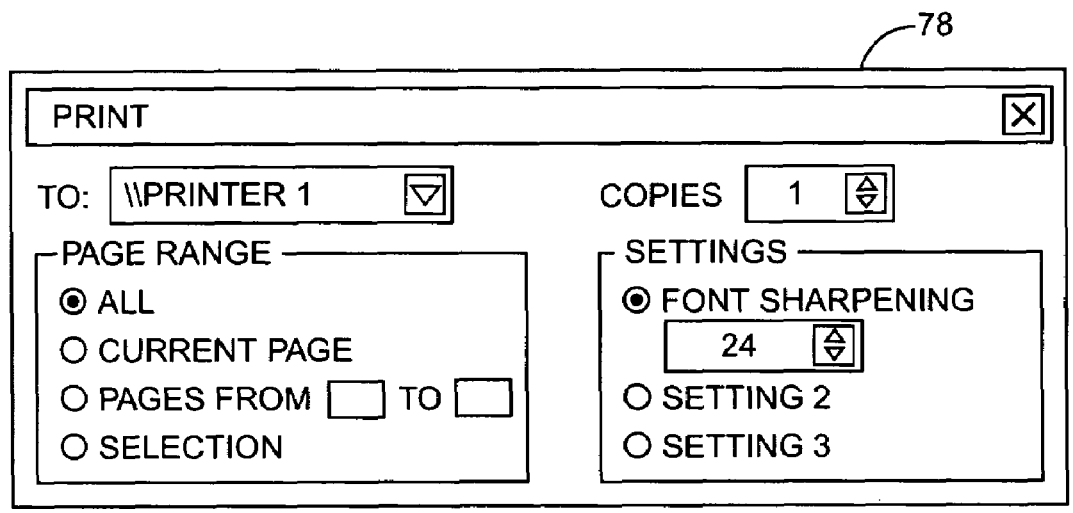
FIG. 7 illustrates an exemplary print dialog box displayed by a print driver for entering a font sharpening threshold by a user.
Figure 8:
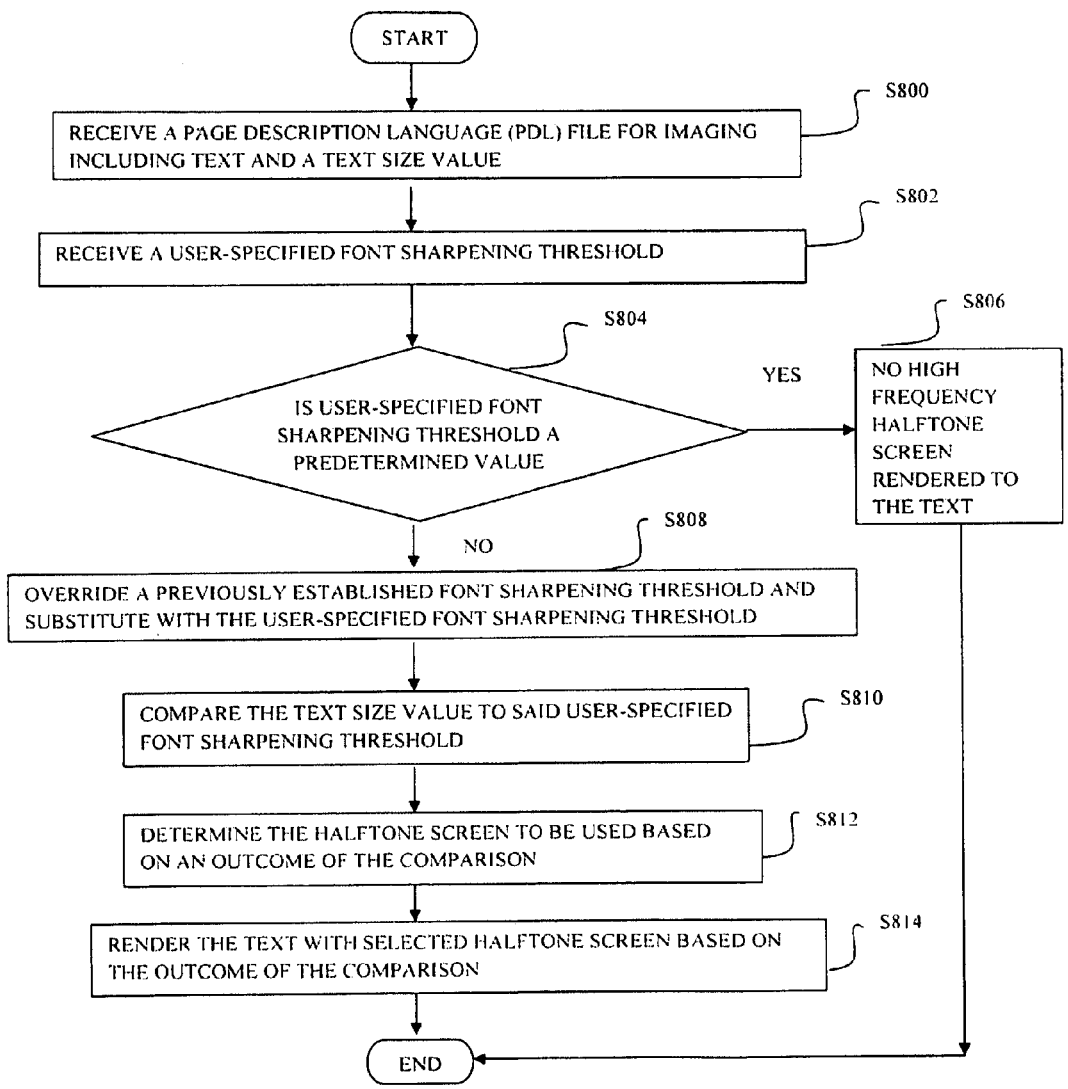
FIG. 8 illustrates a flowchart of a method for rendering text in an image forming device.

The RIP 12 may be programmed with a default font-sharpening threshold. In the preferred embodiment of the invention as shown in FIG. 8, the user may override the default setting and set the font-sharpening threshold to a user-defined value through a suitable user interface, as shown at act S808 of FIG. 8. A variety of user interfaces may be used by a user to set the font-sharpening threshold. A menu item called "font sharpening" may be added to the menu system for the printer 10 that can be accessed by the user through the operator panel 40. In this case, user may set the font-sharpening threshold by navigating through the menus and menu items, selecting the font sharpening menu item, and entering a numerical value corresponding to the text size at which font sharpening is invoked. The numerical value entered by the user could also be a normalized value that does not directly correspond to a text value, but which the RIP 12 uses to determine the text size at which font sharpening is invoked, collectively seen in acts S810, S812 and S814 of FIG. 8. The font sharpening threshold could also be included in the PDL file sent to the printer 10. The user could select the font-sharpening threshold either through the application program used to create the page or through the printer driver 74. A user could also change or set printer settings by sending commands to the printer from a remote computer over a local area network to the printer 10. An application 72 running on a computer 70 may display a dialog box to get the font sharpening threshold from the user (act S802 in FIG. 8). The computer 70 may be connected directly to the printer via a local port, or may be connected via a local area or wide area network. An exemplary dialog box 76 is shown in FIG. 6. The printer driver 74 could also display a print dialog box to get the font sharpening threshold from the user. An exemplary print dialog box 78 is shown in FIG. 7.

The invention claimed is:

1. A method of rendering text in an image forming device comprising:
   receiving a page description language (PDL) file for imaging, said PDL file including said text and a text size value;
   receiving a user-specified font sharpening threshold, said user-specified font sharpening threshold being a separate value from said text size value;
   determining the user-specified font sharpening threshold is a predetermined value and preventing said text from being rendered with a high frequency halftone screen;
   when the user-specified font sharpening threshold is not the predetermined value, overriding a previously established font sharpening threshold and substituting said user-specified font sharpening threshold;

comparing said text size value to said user-specified font sharpening threshold;

determining which halftone screen is to be used for said text based on an outcome of said comparison; and rendering said text with said selected halftone screen based on said outcome of said comparison.

2. The method of claim 1 wherein rendering said text with said halftone screen comprises selecting a halftone screen with a first halftone frequency when the text size value is less than the user-specified font sharpening threshold, and selecting a halftone screen with a second halftone frequency when the text size value is greater than the user-specified font sharpening threshold, said second halftone frequency being lower than said first halftone frequency.

3. A printing system comprising:

a user interface tor entering a user-specific font sharpening threshold;

a raster image processor for generating a halftone image from a digital representation of objects to be printed, said objects including text and said digital representation including a text size value separate from the user-specified font sharpening threshold, said raster image processor programmed to render said text using a halftone screen with a halftone frequency selected based on overriding a previously established font sharpening threshold with said user-specified font sharpening threshold and performing a comparison of the text size value with said user-specified font sharpening threshold input by said user via said user interface, said raster image processor programmed to render said text with low frequency halftone screens without performing the comparison upon receipt of a predetermined user-specified font sharpening threshold; and a raster output device operatively connected to the raster image processor to generate a visible output image using the halftone image output by the raster image processor.

4. The printing system of claim 3 wherein the user interface comprises an operator panel to receive user input specifying the font sharpening threshold.

5. The printing system of claim 3 wherein the raster output device is an electrophotographic print engine.

* * * * *